UNITED STATES PATENT OFFICE.

JAMES LOFTUS, OF TRENTON, ASSIGNOR OF TWO-THIRDS TO JOHN H. PATTERSON, OF MONMOUTH COUNTY, AND GEORGE W. CLAYTON, OF MERCER COUNTY, NEW JERSEY.

NON-CONDUCTING COMPOSITION.

SPECIFICATION forming part of Letters Patent No. 363,834, dated May 31, 1887.

Application filed November 26, 1886. Serial No. 219,875. (No specimens.)

*To all whom it may concern:*

Be it known that I, JAMES LOFTUS, a subject of the Queen of Great Britain, now a resident of the city of Trenton, in the State of New Jersey, have invented a new and useful composition of matter to be used as a non-conductor of heat for boilers, steam-chests, and steam-pipes, and also for loading fire-proof safes, of which the following is a specification.

My composition consists of the following ingredients, combined in the proportions stated, viz: dust from the combustion-chamber of boilers, ten bushels; sawdust, twenty bushels; cocoanut fiber, two bushels; fire-clay, one bushel; lime, one-half bushel; alum, four pounds. These ingredients are to be mixed with water into a paste.

I am aware that a composition consisting of asbestus and other ingredients has been used for similar purposes, and that a patent has been granted therefor; but my composition possesses the following advantages over any other: First, it can be put on while the pipes or boilers are under pressure of steam; second, it will save fifty per centum in fuel.

I am not aware that all of the ingredients of my composition have ever been used together, either in the proportions stated or in any other proportion.

What I claim, and desire to secure by Letters Patent of the United States, is—

1. The herein-described composition of matter to be used as a non-conductor of heat for boilers, steam-chests, and steam-pipes, also for loading fire-proof safes, consisting of dust from the combustion-chamber of boilers, sawdust, cocoanut fiber, fire-clay, lime, and alum, in the proportions above specified.

2. The above composition of matter for the purposes mentioned, consisting of dust from the combustion-chamber of boilers, sawdust, cocoanut fiber, fire-clay, lime, and alum, in any proportions.

JAMES LOFTUS.

In presence of—
D. T. LANE,
WM. HENDRICKSON.